United States Patent
Knoblich et al.

(10) Patent No.: US 11,280,993 B2
(45) Date of Patent: Mar. 22, 2022

(54) IMMERSION SET AND METHOD FOR RETROFITTING AN IMMERSION OBJECTIVE WITH AN IMMERSION SET

(71) Applicant: Carl Zeiss Microscopy GmbH, Jena (DE)

(72) Inventors: Johannes Knoblich, Jena (DE); Ingo Fahlbusch, Göttingen (DE); Markus Sticker, Jena (DE); Ralf Wolleschensky, Jena (DE); Thomas Ohrt, Golmsdorf (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 17/240,001

(22) Filed: Apr. 26, 2021

(65) Prior Publication Data
US 2021/0341723 A1    Nov. 4, 2021

(30) Foreign Application Priority Data

Apr. 29, 2020   (DE) ..................... 10 2020 111 716.7

(51) Int. Cl.
  *G02B 21/33*   (2006.01)
  *G02B 21/36*   (2006.01)
(52) U.S. Cl.
  CPC ........... *G02B 21/33* (2013.01); *G02B 21/361* (2013.01)
(58) Field of Classification Search
  CPC .... G02B 21/0088; G02B 21/02; G02B 21/24; G02B 21/26; G02B 21/28; G02B 21/32; G02B 21/33; G02B 21/248; G02B 21/361; G02B 7/028; G02B 27/0006
  See application file for complete search history.

(56) References Cited

U.S. PATENT DOCUMENTS

| | | |
|---|---|---|
| 3,837,731 A | 9/1974 | Amos et al. |
| 7,304,793 B2 | 12/2007 | Hummel |
| 7,961,384 B2 | 6/2011 | Pirsch |
| 8,199,407 B2 | 6/2012 | Liebel et al. |
| 9,658,426 B2 | 5/2017 | Fahlbusch et al. |
| 9,939,625 B2 | 4/2018 | Herrmann et al. |
| 9,958,664 B2 | 5/2018 | Scheps et al. |

(Continued)

FOREIGN PATENT DOCUMENTS

| | | |
|---|---|---|
| DE | 10123027 A1 | 11/2002 |
| DE | 10333326 A1 | 3/2005 |

(Continued)

OTHER PUBLICATIONS

Dorsch, Rainer, Search Report for DE102020111716.7 with English translation, dated Dec. 7, 2020, 9 pages.

(Continued)

*Primary Examiner* — Mustak Choudhury
(74) *Attorney, Agent, or Firm* — LaBatt, LLC

(57) ABSTRACT

An immersion set for retrofitting an immersion objective comprises at least one immersion fluid tank, at least one pump fluidly connected to the immersion fluid tank, and a control electronics unit configured at least to control the pump. A fastening device is configured to realize the load-bearing fastening of the at least one immersion fluid tank, the at least one pump and the control electronics unit on the immersion objective or on a mounting adapter for the immersion objective.

20 Claims, 13 Drawing Sheets

(56) References Cited

U.S. PATENT DOCUMENTS

| | | | |
|---|---|---|---|
| 10,649,194 B2 | 5/2020 | Kalkbrenner et al. | |
| 2007/0047093 A1 | 3/2007 | Hoering et al. | |
| 2010/0027109 A1* | 2/2010 | Liebel | G02B 27/0006 |
| | | | 359/381 |
| 2016/0334611 A1* | 11/2016 | Herrmann | G02B 21/26 |
| 2017/0336615 A1* | 11/2017 | Nakamura | G02B 21/0088 |
| 2020/0271912 A1 | 8/2020 | Pergande et al. | |

FOREIGN PATENT DOCUMENTS

| | | |
|---|---|---|
| DE | 102005040828 A1 | 3/2007 |
| DE | 102006042088 A1 | 3/2008 |
| DE | 102013006997 A1 | 10/2014 |
| DE | 102013011544 A1 | 1/2015 |
| DE | 102015200927 A1 | 7/2016 |
| DE | 202017000475 U1 | 2/2017 |
| DE | 102017217380 A1 | 4/2019 |
| EP | 1717628 A1 | 11/2006 |
| JP | 2005234458 A | 9/2005 |
| JP | 2010026218 A | 2/2010 |
| WO | 2008028475 A2 | 3/2008 |
| WO | 2019016048 A1 | 1/2019 |
| WO | 2019063782 A2 | 4/2019 |

OTHER PUBLICATIONS

Dorsch, Rainer, Search Report for DE102020111716.7, dated Dec. 7, 2020, 5 pages (English translation not available).

* cited by examiner

IMMERSION SET AND METHOD FOR RETROFITTING AN IMMERSION OBJECTIVE WITH AN IMMERSION SET

REFERENCE TO RELATED APPLICATIONS

The current application claims the benefit of German Patent Application No. 10 2020 111 716.7, filed on 29 Apr. 2020, which is hereby incorporated by reference.

FIELD OF THE DISCLOSURE

The present invention relates to an immersion set for retrofitting an immersion objective configured in particular for the manual realization of the immersion. The disclosure further relates to a method for retrofitting an immersion objective with an immersion set for the automated realization of the immersion.

BACKGROUND OF THE DISCLOSURE

Immersion objectives are used in numerous light microscopy applications. An immersion objective is an objective whose front side is immersed in an immersion medium (immersion fluid) during operation. The immersion fluid is applied, for example, on a cover slip under which a sample to be analyzed is located.

Immersion fluids should generally be applied in a controlled and targeted manner. This is frequently carried out manually, which requires practice by the user. With electronically controlled immersion devices, it should be possible to apply, in particular to a precisely defined location, an amount of immersion fluid that can be set or replicated with precision. In the case of long-term analyses, a precise addition of immersion fluid should be possible. At the same time, a simple operability for a user is desired without manual imprecisions effected by a user potentially leading to an imprecise application of immersion fluid. Moreover, for a simple operability, a compact design of the overall immersion system is desired. It should be avoided that the different components used for immersion fluids get in the way and impede the handling of the microscope. In particular, the function of other microscope components should ideally not be adversely affected by an immersion device.

Numerous immersion devices for the automated feeding of the immersion fluid are known in the prior art, which, however, do not completely satisfy the aforementioned objects.

Known immersion devices mostly require a relatively large amount of space, which can adversely affect other microscope functions, for example an overview camera or motorized microscope components. If the larger components of the immersion device are positioned further away, it is still necessary for, e.g., tubes to extend to the area between the specimen and the immersion objective. In this case, the tubes can continue to impede microscope functionalities such as an overview camera.

A cap comprising channels for the immersion fluid is also frequently placed on the objective. Tubes from components of the immersion device positioned at a distance from the objective lead to this cap. The caps are typically specially fitted to a certain objective type and cannot be used with other objectives.

Immersion devices exhibiting one or more of the aforementioned problematic characteristics are described in the following publications:

EP 1 717 628 B1, WO 2019/016048 A1, DE 10 333 326 B4, DE 10123027 B4,
DE 10 2005 040 828 A1, WO 2019/063782 A2, DE 10 2017 217 380 A1,
DE 10 2013 011 544 A1, DE 10 2006 042 088 B4, US 3 837 731 A,
JP 2005 234 458 A, DE 10 2015 200 927 A1, DE 20 2017 000 475 U1,
JP 2010 026 218 A and WO 2008/028475 A2.

In addition, DE 10 2013 006 997 A1 describes an objective lens mount with an electric interface for increasing the functionality of an objective, An immersion device as described in the aforementioned prior art is not ideal on account of one or more of the following disadvantages: their relatively large dimensions, a to some extent complex handling, a hindering of other microscope components or the relatively low number of objective types that they can be used with.

SUMMARY OF THE DISCLOSURE

The indication of an immersion set and a method by means of which an immersion fluid can be fed with precision, the handling and execution of which are simultaneously straightforward and which ideally do not entail any limitation of other microscope functions can be considered an object of the invention.

This object is achieved by means of the immersion set with the features of claim 1 and by means of the method with the features of claim 18.

An immersion set according to the invention for retrofitting an immersion objective comprises at least one immersion fluid tank, at least one pump fluidly connected to the immersion fluid tank, and a control electronics unit configured at least to control the pump. The immersion set further comprises a fastening device configured to realize a load-bearing (or weight-bearing) fastening of the at least one immersion fluid tank, the at least one pump and the control electronics unit on the immersion objective or on a mounting adapter for the immersion objective.

A method according to the invention for retrofitting an immersion objective with an immersion set comprises a load-bearing fastening, by means of a fastening device, of at least one immersion fluid tank, at least one pump and a control electronics unit for the pump on the immersion objective or on a mounting adapter for the immersion objective.

By means of the invention, all components required for immersions may be arranged on the objective and in particular supported by the objective. This way, the functionality of almost any immersion objective can be enhanced by an electronically controlled feeding of immersion fluid. This is particularly advantageous for the retrofitting of existing immersion objectives. The components arranged on the objective comprise at least the immersion fluid tank, the pump for immersion fluid and the corresponding control electronics unit. In contrast to the known prior art, this obviates the need for discrete immersion devices that are spatially separate from the objective being used. The risk of collisions with components of a separate immersion device during the changing of an objective is thereby avoided. Other microscope functions are not or hardly hindered thanks to the small size of the immersion components arranged on the objective. As a result, the immersion set according to the invention can be readily used with a variety of different light microscopes without necessarily requiring modifications of the light microscope or special arrangements of immersion fluid components on the microscope stand or on the objective revolver. Herein lies a significant difference from the prior art discussed above, in which parts of the immersion device (for example the pump) have to be arranged separately on the objective revolver or on the stand.

For example, the invention may enable an automated feeding of immersion fluid, in particular as a supplemental immersion, in long-term experiments, some of which last several days. This advantage is particularly relevant in cases where a subsequent immersion would otherwise have to be carried out manually, e.g. every 30 min., by a user.

Optional Embodiments

Variants of the immersion set of the invention, which may also be referred to as an auxiliary immersion set or a retrofitting immersion set, and of the method of the invention are indicated in the dependent claims and will be explained in greater detail in the following description.

Electrical Contact Unit

The immersion set can comprise an electrical contact unit, which is connected to the control electronics unit and to the pump and is configured to establish an electrical connection. The electrical contact unit can be configured to be connected to the mounting adapter described below, to electrical contacts potentially provided on the immersion objective or to electrical contacts at an objective connection of an objective revolver, e.g. the electrical contacts of a bayonet connector. In the case of a mounting adapter, a detachable connection to electrical conductors/contacts of the mounting adapter can be provided or, alternatively, a permanent connection can be realized therebetween. For an operation without a mounting adapter, the electrical contact unit can be arranged in particular so that it extends in the mounted stated into the area of an objective connection on an objective revolver. There, the electrical contact unit can contact, provided that an objective with an electrical interface is used, electrical contacts of the objective, which are optionally also used for establishing an electrical connection with the objective-revolver interface. For example, the electrical contact unit can use the electrical interface of an objective with a bayonet connector while this electrical interface is also used for establishing a contact on the objective revolver.

In principle, an electrical contact unit is not obligatory, it being possible to provide a battery and optionally wireless communication means instead. These can likewise be fastened on the immersion objective or on a mounting adapter via the fastening device.

Mounting Adapter

The immersion set can also comprise a mounting adapter for an immersion objective. The mounting adapter can be annular and has a mounting connection for an immersion objective, for example a thread. For connecting to an objective revolver, the mounting adapter further has a mounting interface different from the mounting connection and which can comprise, e.g., a bayonet connection. By means of the latter, it is possible to establish a connection in particular with a bayonet connector of an objective revolver comprising electrical contacts.

Almost any immersion objective can be retrofitted by means of the mounting adapter. A power supply and/or control of the pump and control electronics unit via the objective-revolver connection, i.e. via an objective revolver with an electrical interface, is advantageous. Many conventional immersion objectives, however, do not have an electrical interface or in other words only comprise a mounting connection (i.e. a threaded connection) that is incompatible with objective revolvers with an electrical interface (i.e. with a bayonet-type connection). The mounting adapter permits the use of immersion objectives which do not have an electrical interface. An electrical connection of the pump and control electronics unit arranged on the immersion objective is nevertheless achieved, as described in greater detail below.

The mounting interface of the mounting adapter can comprise an optional electrical interface (for example on a face side facing the objective revolver) through which electrical contacts of the objective revolver can be contacted. In this case, the mounting adapter further comprises electrical conductors, which are connected to the electrical interface and lead to electrical contacts for an electrical coupling with the electrical contact unit. Said electrical contacts can be formed by angled contact surfaces, which thus do not extend perpendicularly to an optical axis/longitudinal axis of the objective, but rather obliquely or parallel to said optical axis. Instead of a detachable coupling as described here, it is in principle also possible to provide a permanent electrical connection between the mounting adapter and the electrical contact unit.

Alternatively, the mounting adapter can rather be purely mechanical and not comprise any electrical contacts. In this case, the mounting adapter and the electrical contact unit are configured so that the mounting adapter is mountable on an objective-revolver connection (i.e. on a bayonet connector) and the electrical contact unit can simultaneously contact the electrical contacts of said objective-revolver connection. The mounting adapter can consequently comprise a recess by means of which electrical contacts of the objective-revolver connection are left free.

The mounting adapter can be mechanically and electrically couplable to the control electronics unit and the pump. Alternatively, the mounting adapter can instead be rigidly connected to these components or to a housing part which is in turn connected to the control electronics unit and the pump. In principle, a mounting adapter can be considered part of the immersion objective or come pre-assembled on the immersion objective. In particular in these cases, the mounting adapter can comprise, instead of a thread, a locking cylinder, which is (permanently) connected to an objective body of the immersion objective. Such a solution is particularly suitable in the case of electrical objectives, for example autocorr objectives.

Fastening Device

Immersion components, including at least the immersion fluid tank, the at least one pump and the control electronics unit, can be fastened via the fastening device. A direct connection can be provided between the fastening device and the aforementioned immersion components or an indirect connection via intermediate components. For example, it can be provided that the immersion fluid tank is supported by a tank connection, which in turn is connected directly or indirectly to the fastening device.

The fastening device can realize a fastening and support of the immersion set on the immersion objective, in particular on the objective circumference. This is intended to mean that the weight of the aforementioned immersion components is supported via the immersion objective. This is not the case with conventional immersion devices with which a fluid connection is established with a tank and pump positioned at a distance from the objective, e.g. via a cap attachment on the objective, so that the tank and pump are precisely not supported by the objective. In general, the fastening device can also provide, instead of a fastening on the objective, a fastening on a mounting adapter connected between the objective and the objective revolver. In principle, the realization of a load-bearing fastening can also occur via intermediate components, for example via a sleeve placed around the objective and supported on the objective or on the mounting adapter.

The immersion fluid tank, the pump and/or the control electronics unit can be fastened on a housing part. The housing part can in turn be fastened by the fastening device or be considered part of the fastening device. A concave or cylinder-segment shape of the inner side of the housing part can facilitate a stable, form-fitting contact with an outer side of the immersion objective.

The fastening device can comprise a fastening clip which is configured to clasp the immersion objective. In particular, the fastening clip can be connected to the aforementioned housing part and be tightened by screws.

The housing part can also comprise screw holes for screwing the housing part to an outer shell/outer side of the immersion objective. Screws can be screwed into the outer shell of the immersion objective in this case. The screw holes can also serve to attach the fastening clip. In example embodiments in which other fastening options are utilized, the housing part can still comprise these screw holes. By providing different mounting options, the immersion set can be used with a greater variety of different immersion objectives.

The fastening device can also comprise elastic cable ties or releasable cable ties (reusable cable ties). A slot can be provided, for example on the aforementioned housing part, for the passage of the cable tie. The cable tie can then be tightened around the circumference of an immersion objective. Cable ties and the aforementioned fastening clip can be considered concrete examples of a fastening device comprising a fastener for clasping a circumference of an immersion objective, wherein the fastener has an annular configuration to this end and/or can be bent into an annular shape.

The fastening device can also comprise a snap fastener by means of which an interlocking connection, via which the circumference of an immersion objective is enclosed, is provided. The snap fastener can, for example, be made of plastic.

The fastening device preferably permits an azimuthal alignment prior to the realization of the load-bearing fastening. For example, a fastening clip placed around the objective can be turned before being tightened. The azimuthal alignment can be important for a correct contacting of the electrical contact unit. For example, an objective with a thread is screwed into a mounting adapter. It is now intended that the electrical contact unit of the immersion set should touch electrical contacts on the mounting adapter or on the objective revolver. Setting the right degree of rotation via the thread alone would be difficult. The azimuthal alignment that matches the electrical contacts is thus preferably set by turning the fastening device together with the components attached thereto before fastening the same on the objective.

Optional additional components of the immersion set such as further pumps or (residual) immersion fluid tanks can also be mounted via the fastening device.

Tank Connection

At least one tank connection can be provided, which is fluidly connected to the pump and to which the at least one immersion fluid tank can be connected in a detachable manner. The tank connection is optionally pivotable, in particular by 180°, for inverted and upright microscopy. A height of a fluid connection of the tank connection relative to a tank fastening position on a housing part of the immersion set is changed by said pivot. It can thus be achieved that the fluid connection with the immersion fluid tank occurs in its lower area in both an inverted as well as an upright operation of the microscope. This is important so as to ensure that the pump draws immersion fluid, and not air, from the immersion fluid tank. Preventing a drawing of air is particularly important during long-term experiments, as otherwise the entire long-term experiment would be jeopardized.

Immersion Fluid Tank

An immersion fluid tank can generally be understood to be a fluid container. A refill opening for the refilling of immersion fluid can be provided on the immersion fluid tank. A valve or cap on the refill opening can prevent contaminants from entering while immersion fluid can be refilled via, e.g., a syringe. The refill opening can be located at a position obliquely opposite a fluid connection joined to the tank connection leading to the pump.

Each immersion fluid tank can also comprise an air vent valve, which can be arranged at an end opposite the end with the fluid connection leading to the pump. The pump can thus be connected to the lower area of the immersion fluid tank during operation, while the air vent valve is located at the upper end. By means of the air vent valve, a negative pressure in the immersion fluid tank, which would hamper a precisely dosed conveyance of immersion fluid by the pump, is avoided when the immersion fluid tank is in a partially filled state.

The immersion set can also comprise two immersion fluid tanks which differ in the arrangement of their respective refill openings. In this scenario, the appropriate immersion fluid tank for an inverted microscope operation or for an upright microscope operation is connected at the tank connection to the pump.

Each immersion fluid tank can comprise a flexible bag (collapsing bag) with immersion fluid, which can be accommodated in particular in a shell, e.g. a rigid housing, of the immersion fluid tank. A collapsing bag renders possible an emptying of the bag contents during both inverted as well as upright microscope operation regardless of its orientation or the position of the tank connection. It can be provided that solely the collapsing bag, as opposed to a free space between the bag and the rigid housing, is filled with immersion fluid. If the collapsing bag is still completely filled with immersion fluid, it substantially takes up the entire volume of the rigid housing so that the free space between the bag and the housing is minimal. As immersion operations are conducted, the collapsing bag collapses on itself so that the free space is created or grows and can serve as a collection space for removed residual immersion fluid. For this purpose, a fluid connection can optionally be provided on the housing through which removed immersion fluid is guided into the free space and not into the collapsing bag. This way, both an immersion reservoir as well as a collection space for removed immersion fluid are provided in an extremely efficient manner in terms of the use of available space.

A flexible bag can be connected directly to the tank connection, which in this case does not have to be pivotable. A form-stable housing can optionally surround the collapsing bag and facilitate mounting. Alternatively, the immersion fluid tank can comprise the collapsing bag in addition to a form-stable tank. In contrast to the embodiment variants described above, the collapsing bag in this case is connected to the form-stable tank as a reserve volume. Both the collapsing bag and the form-stable tank are filled with immersion fluid in this case. The form-stable tank can also be furnished with an inner collapsing bag so that air cannot get into the system. The inner collapsing bag and the collapsing bag connected externally can be directly connected to one another. The collapsing bag is optionally oriented relative to the electrical interface so as to be oriented (in a mounted state on an immersion objective and objective revolver) in a direction towards the rotation axis of the objective revolver. The available space is thus used efficiently without a risk of collision with objectives or components at other connections of the objective revolver.

An immersion fluid tank can also comprise an electrical connection, which is connected so as to communicate with the control electronics unit when the immersion fluid tank is in the mounted state. A power supply of components of the immersion fluid tank can occur and the control electronics unit can read data from the immersion fluid tank via this electrical connection. For example, an immersion fluid tank can comprise a chip or memory with data, in particular regarding the type of immersion fluid and/or the original fill volume. A fill-level sensor can be one of the components supplied with power. The control electronics unit can receive a measured value for the fill level and emit instructions or data as a function of said value (for example a refill command) via the electrical interface. The control electronics unit can also stop the pump as soon as the filling level reaches a minimum level. It is thus prevented that the pump draws air instead of immersion fluid.

In principle, the pump can also be integrated in the immersion fluid tank. The pump and the immersion fluid tank can thus be replaced together, for example when disposable immersion fluid tanks are used. Contaminations or the formation of germs on the pump can thus be averted particularly reliably.

The immersion set can also comprise at least two immersion fluid tanks, which can be simultaneously fastened to an immersion objective via the fastening device. The immersion fluid tanks can in particular contain different immersion fluids. Each immersion fluid tank can be connected to a corresponding pump so that it is thus possible to fasten a plurality of pumps simultaneously to an immersion objective via the fastening device. Different tubes or channels leading to the objective front side in the mounted state can be provided for different immersion fluid tanks. Alternatively, a Y channel (Y shunt) can be connected to the two immersion fluid tanks directly or via intermediate components. By means of the Y channel, the contained immersion fluids, for example glycerine and water, can be mixed. Only one tube or channel then guides the mixture to the objective front side. The control electronics unit can set a mixing ratio of the two immersion fluids via a corresponding control of the respective pumps. If, instead of a mixture, only one of the immersion fluids is required, then only one of the pumps is operated. Instead of a plurality of pumps, a single pump can also suffice when adjustable valves are provided between the pump and the immersion fluid tanks. In this case, a mixing ratio can be set via the valves.

It is additionally possible to fasten a residual immersion fluid tank and a residual immersion fluid pump via the fastening device. The residual immersion fluid pump is arranged so as to suction immersion fluid from an objective front side to the residual immersion fluid tank. In principle, the residual immersion fluid tank and the residual immersion fluid pump can be designed in the same manner as the immersion fluid tank and pump described in the foregoing.

Immersion Fluid Tube

An in particular flexible immersion fluid tube can be fluidly connected to the pump or to the optional Y channel. A flexible gooseneck tube supported via the fastening device can also be provided. For example, the gooseneck tube can be fastened on the pump or on a housing part connected to the fastening device. The immersion fluid tube is guided through the gooseneck tube, i.e. it is housed in the gooseneck tube and the direction of its extension is determined by the gooseneck tube. A gooseneck tube is understood to denote a deformable tube that retains a given shape. It can in particular be flexible or comprise at least one articulation. In the mounted state, the gooseneck tube extends in the direction of the objective front side where a front optic is to be immersed in immersion fluid. The combination of the immersion fluid tube and the gooseneck tube allows a precise positioning for an immersion fluid discharge while simultaneously avoiding that the gooseneck tube comes into contact with immersion fluid. The immersion fluid tube, which comes into contact with immersion fluid, can be replaced easily and inexpensively.

A rigid cannula extending away from the gooseneck tube can be arranged at one end of the immersion fluid tube. The cannula extends toward the objective front side in the mounted state. A contact between the gooseneck tube and an immersion fluid can thus be prevented even more reliably. The risk of contamination by immersion fluid residues or a possible formation of germs thus substantially only pertains to the immersion fluid tube and the cannula. The latter can be easily replaced so that an otherwise tedious cleaning, as required in systems of the prior art, is often not necessary. An orientation of the cannula is determined by the gooseneck tube. For example, the cannula can be positioned at the end of the gooseneck tube, wherein a fluid connection with the immersion fluid tube is established.

A filter can be provided at the end of the cannula. By means of a filter, the formation of air bubbles in the outgoing immersion fluid is avoided. Air bubbles would interfere, for example, with an autofocusing system or the viewing of the sample.

At least one end of the cannula can comprise a coating by means of which the surface of the cannula is rendered hydrophilic or hydrophobic. This can be advantageous for a desired spread of the immersion fluid at the front lens of the immersion objective and for forming a stable fluid cone. The immersion set can comprise a plurality of cannulas with different hydrophobic or hydrophilic coatings so that a suitable cannula can be selected and mounted regardless of the immersion fluid currently used (e.g. water, oil or a mixture). The front surfaces of the objective can optionally also comprise such a hydrophilic or hydrophobic coating in order to improve the stability of the immersion fluid cone.

Pump

The pump may be understood to designate every device suitable for conveying the immersion fluid from an immersion fluid tank or for conveying immersion fluid to a residual immersion fluid tank. Compact dimensions of the pump in the form of a micropump are advantageous. The pump can be designed, for example, as a piezoelectric pump, as an electroosmotic pump or as a tube pump. In the case of a tube or peristaltic pump, the pump effects an outer mechanical deformation (pillowing) of a tube so that immersion fluid is conveyed in the same. In the process, the tube pump does not itself come into contact with the conveyed immersion fluid so that contaminations of the tube pump do not occur. If an immersion fluid tank is designed as a flexible bag, then the pump can also be a device which exerts a pressure on the bag.

It is also possible to provide two pumps, which are connected to the same immersion fluid tube leading in the direction of the objective front side. One pump can be controlled for conveying immersion fluid to the objective front side while the other pump can be controlled for suctioning immersion fluid from the objective front side. Both pumps can be connected to the same immersion fluid tank, which can be designed in particular as a collapsing bag. Immersion fluid can be re-used this way. If, alternatively, a collapsing bag in a (rigid) container is employed as an immersion fluid tank, then one pump can be connected to the collapsing bag and the other pump can be connected to the space between the collapsing bag and the surrounding container. One pump can thus convey immersion fluid from the collapsing bag towards the objective front side. The other pump can pump immersion fluid away from the objective front side into the aforementioned space. This arrangement is not only efficient in terms of its use of space, but also renders possible the re-use of removed immersion fluid. This can be particularly useful in long-term experiments. In variants of this embodiment, the second pump for pumping immersion fluid away from the objective front side can also be connected to a residual immersion fluid tank, which can accommodate immersion fluid that is no longer needed and be designed like the collapsing bag.

Damage-Protection System

In the case of an accidental leakage of liquids, e.g. immersion fluid or sample liquid from a sample container that has been knocked over, the light microscope should be protected from ensuing damage. Appropriate damage-protection components can provide a liquid-tight sealing or a desired fluid drainage at different points on the microscope. The immersion set of the invention can comprise an optional objective protection ring for a liquid-tight sealing, which comprises an elastic sealing ring for enclosing the immersion objective. The sealing contact can in particular be realized against the casing surface of the objective or against the mounting adapter of the immersion set. It can, however, be preferable for the mounting adapter to be configured to be, in terms of its height, i.e. along the optical axis, as small as possible, in particular with a minimum height required for contacting the objective interface. More installation space can thereby be provided for the objective.

The objective protection ring can alternatively or additionally also comprise a form-stable ring, for example a plastic ring, for a desired drainage of a (spilled) liquid. The objective protection ring can comprise an indentation for the liquid-tight passage of the electrical contact unit. The objective protection ring can further optionally comprise electrically conductive parts for electromagnetic shielding. Shielding is of increased importance here on account of the arrangement of the control electronics unit and the pump on the objective. The objective protection ring can thus provide two significant functions, a liquid-tight sealing and an electromagnetic shielding, the advantageous effects of which are significant precisely because of the electronic components of the immersion set. The electrically conductive parts of the objective protection ring can in particular be made of metal. For example, these parts can be a metal coating or metal particles distributed in the material of the ring, e.g. an elastic rubber or silicone ring or a plastic ring.

In addition to the objective protection ring, a revolver cover can also be provided, which covers the objective revolver. The objective protection ring overlaps with the revolver cover, in a manner similar to roof shingles or roof tiles, in order to drain liquid to the revolver cover. Moreover, a stand protector which comprises a drainage channel and receives liquid from the revolver cover can be provided. The revolver cover is fastened on the objective revolver so as to turn with it while the stand protector can be stationary.

General Features

The invention relates to a combination of an immersion objective and an immersion set according to the invention mounted thereon. Moreover, the invention relates to a light microscope with a stand, an objective revolver and the aforementioned combination of an immersion objective and an immersion set.

An immersion objective is understood here as an objective that is designed to be attached to a light microscope and used with an immersion fluid. Different immersion objectives can be designed for different immersion fluids and provide various additional functionalities, for example an autocorr function or a zoom function. In the case of an autocorr function, the thickness of the slide as well as the refractive index and temperature of the immersion fluid can be corrected by means of internal lens adjustments. An essential advantage of the immersion set is that it can be used with almost any conventional objective. However, objectives can also be designed specifically for the accommodation of an immersion set: An objective can thus provide mounting elements on its outer side for the fastening device, for example threaded holes. Additionally or alternatively, it is also possible to provide a plug/socket connection, to which end, for example, a recess can be formed in an outer shell of the immersion objective, into or onto which the immersion set is plugged. The objective can also comprise an electrical interface, in particular in said recess, which is contactable by the electrical contact unit of the immersion set. An optional seal made of, e.g., rubber can surround the recess and the electrical contact surfaces.

The objective front side denotes the end of the immersion objective that faces a sample. During operation, a part of the objective front side should be immersed in immersion fluid. Changes in the calibration of image length can result from corrections on the objective, which cause the front contour of the objective to be moved along the optical axis. It can thus be preferable to fasten the gooseneck or the cannula to the front contour of the objective, for which purpose a corresponding mechanical or magnetic support can be provided.

Descriptions in the singular are employed for the sake of an easier comprehension and do not necessarily mean that a single component is provided. If, for example, the description "the pump" is described, further pumps optionally formed in the manner of the described pump may also be provided. In particular, a plurality of tank connections and a corresponding number of pumps and immersion fluid tanks can be provided and simultaneously connected to the same immersion objective. The immersion set can also comprise further immersion fluid tanks which are not intended to be used simultaneously and which provide a compatibility for both the inverted as well as the upright operation of the microscope or which differ with respect to the immersion fluids they contain. The number of immersion fluid tubes leading to the objective front side can be equal to the number of simultaneously mounted immersion fluid tanks or lower, in particular when a Y channel as described above is used.

The immersion set can also comprise an electrically operable heating element, for example a heating foil. The heating elements can be provided for the heating of the immersion fluid and/or for the heating of a part of the immersion objective. The heating element is controlled by the control electronics unit and is also powered via the electrical contact unit.

The characteristics described as additional features of the immersion set, if used as intended, also yield variants of the method according to the invention. Conversely, the immersion set can also be configured to carry out the described method variants.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EXAMPLE EMBODIMENTS

Example Embodiments of FIGS. 1 to 10

Example embodiments of an immersion set 10 according to the invention are described with reference to FIGS. 1 to 10.

The immersion set 10 can be fastened on a conventional immersion objective 1 and can comprise all components necessary for dispensing immersion fluid to an objective front side 5. The immersion set 10 here is configured in a space-saving manner and can be mounted directly on the immersion objective 1, which makes it straightforward to use and does not hamper other microscope functionalities due to its compact arrangement directly on the objective. The application of immersion fluid can occur in an automated manner, which eliminates tedious and error-prone actions by a user. Automation is particularly advantageous in long-term experiments.

Figure 1:
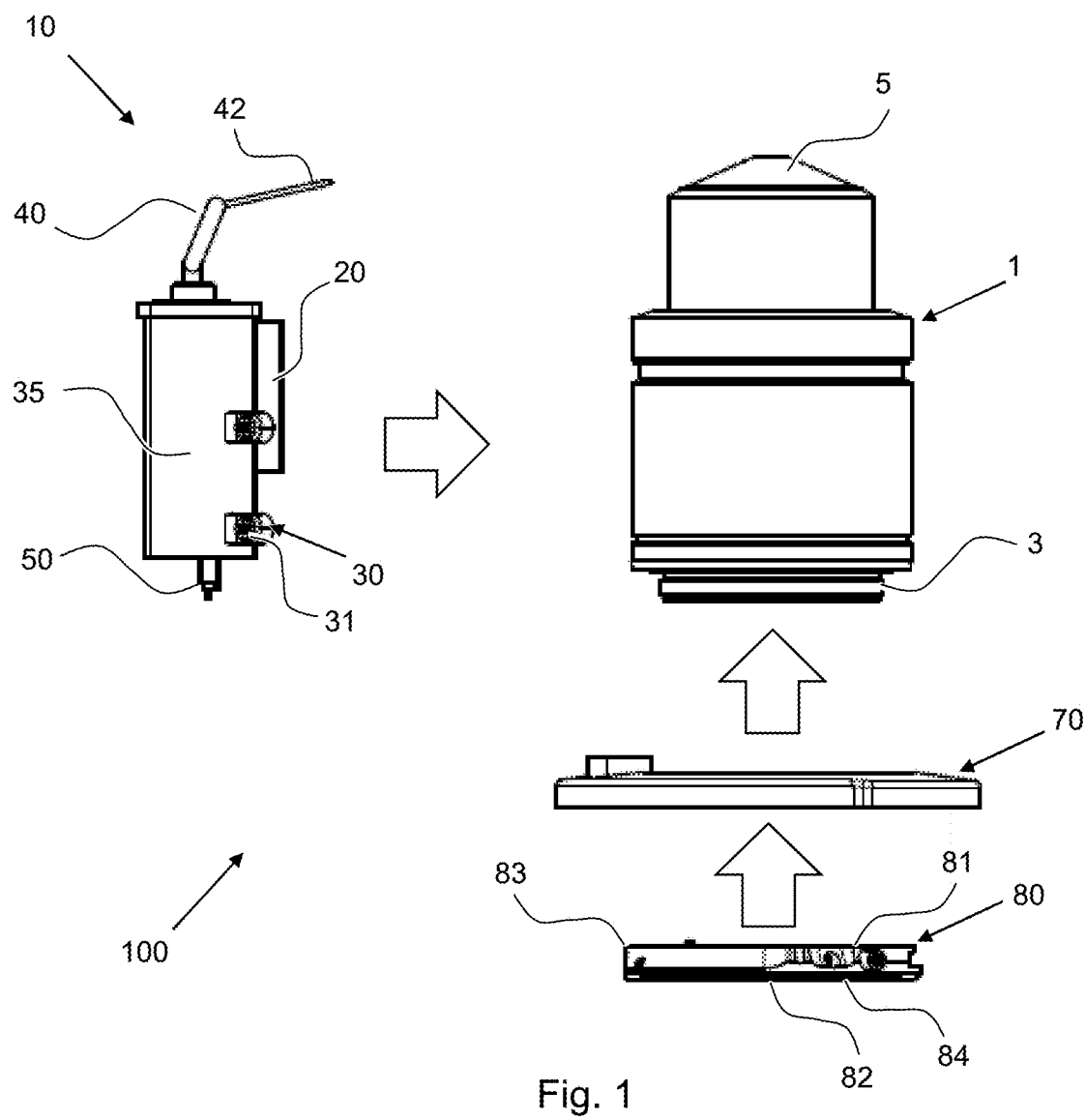
FIG. 1 is a schematic, exploded depiction of a combination of an objective and an immersion set according to an example embodiment according to the invention.
Figure 6:
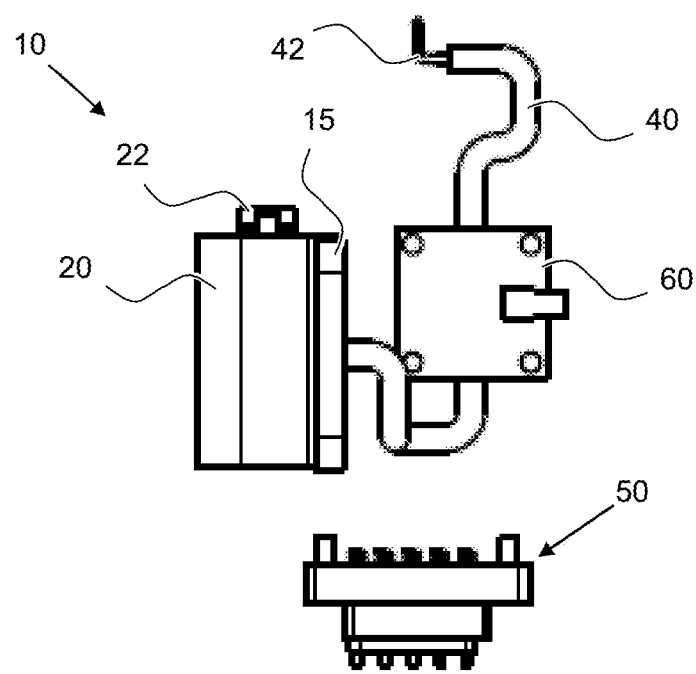
FIG. 6 shows components of the immersion set of an example embodiment according to the invention.

FIG. 1 shows in an exploded depiction how the immersion set 10 is connected to an immersion objective 1. FIGS. 2-5 and 9 show a mounted state of the immersion set 10 and immersion objective 1. The combination according to the invention of an immersion set 10 and an immersion objective 1 is designated by the reference 100. FIGS. 6-8 and 10 show the immersion set 10 alone, wherein only certain components of the immersion set 10 are shown in FIG. 6 with the housing removed.

As shown, e.g., in FIG. 1, the immersion set 10 comprises an immersion fluid tank 20 from which immersion fluid can be conveyed via an immersion fluid tube and a cannula 42 to the objective front side 5. The immersion fluid tank 20 is connected to a housing, which can comprise a housing part 35 or a plurality of housing parts. Screw holes 31 enabling a fastening of the immersion set 10 on the immersion objective 1 are located on the housing part 35. The housing part 35 and the screw holes 31 can thus be considered part of a fastening device 30. The immersion set 10 further comprises an electrical contact unit 50 by means of which components of the immersion set 10 described below in greater detail are supplied with electrical energy and can communicate.

In this example, the immersion objective 1 does not include any electrical interfaces so that it is consequently not possible to connect the electrical contact unit 50 electrically via the immersion objective 1. In order to provide an electrical connection nevertheless, it should be possible for the immersion set 10 and the immersion objective 1 to be used on an objective revolver with electrical contacts. This is rendered possible by a mounting adapter 80 of the immersion set 10. The mounting adapter 80 in this example has a mounting interface 82 with an electrical interface 84, by means of which it can be mounted on an objective revolver with electrical contacts. For example, the mounting interface 82 can be a bayonet connector. On its side lying opposite the mounting interface 82, the mounting adapter 80 has a mounting connection 81 for connecting to the immersion objective 1. The mounting connection 81 can comprise, for example, a thread so that immersion objectives with a thread 3, which would otherwise not be able to be fastened to the bayonet connector of the objective revolver, may be used. In order to enable an electrical connection with the electrical contact unit 50, the mounting adapter 80 further comprises electrical contacts 83. These are arranged so as to be accessible for the electrical contact unit 50 in a mounted state, in which the mounting adapter 80 is mounted with the objective, e.g., on an objective revolver. For example, the electrical contacts 83 can be located on a peripheral surface of the mounting adapter 80. The electrical interface 84 for contacting corresponding contacts of the objective revolver, on the other hand, can be located on a face side of the mounting adapter 80. The electrical contacts 83 are connected to the electrical interface 84 in the mounting adapter 80 in an electrically conductive manner. The mounting adapter 80 is thus not only a mechanical adapter for the immersion objective 1, but simultaneously also the electrical connection for the electrical contact unit 50.

The immersion set 10 can be used with both upright as well as inverted microscopes. In the inverted operation, the objective front side 5 is located above the mounting side with the thread 3, as shown in FIG. 1. There is thus the risk in the event of an accidental leakage of immersion fluid that immersion fluid gains ingress into the objective revolver and other microscope components. To prevent this from happening, the immersion set 10 additionally comprises an objective protection ring 70. The objective protection ring 70 is placed over the immersion objective 1 and provides a liquid-tight sealing and/or fluid drainage. The objective protection ring 70 can comprise a recess, for example a slot, for the electrical contact unit 50. The mounting adapter 80 can be arranged in or under the objective protection ring 70.

Figure 2:
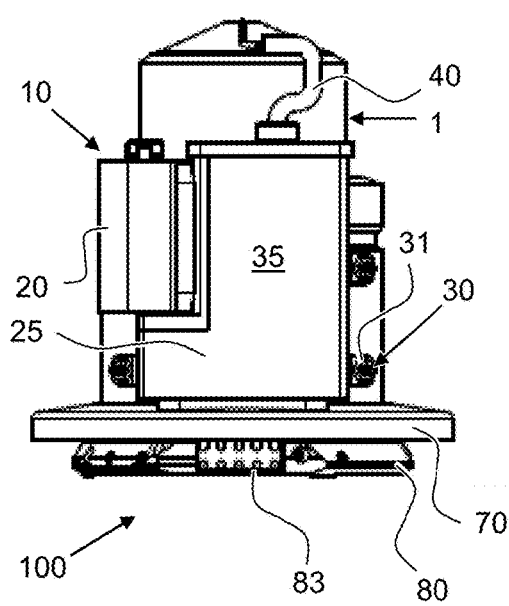
FIG. 2 shows a front view of the objective of FIG. 1 with a mounted immersion set.
Figure 3:
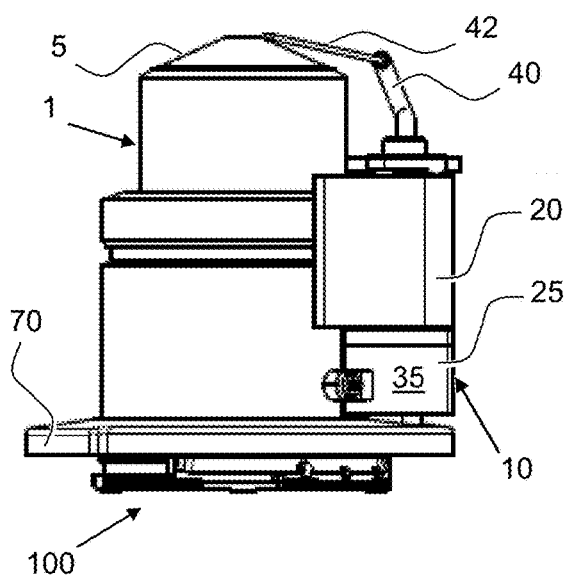
FIG. 3 shows a side view corresponding to FIG. 2.
Figure 4:
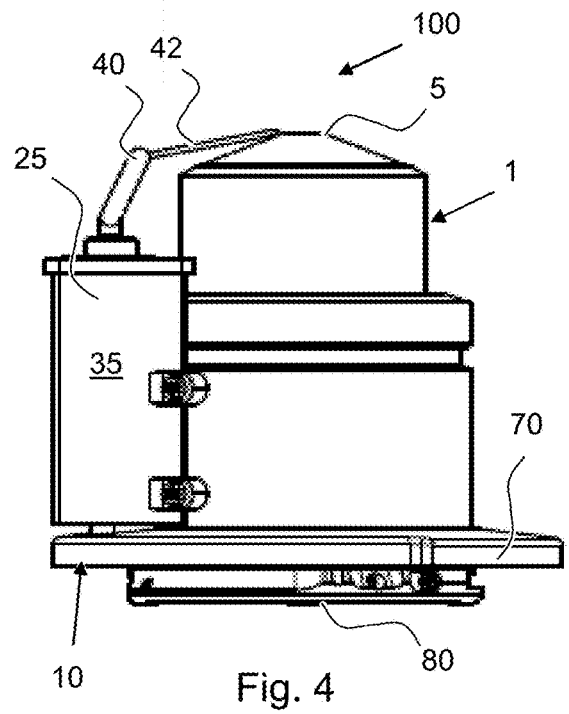
FIG. 4 shows an opposite side view corresponding to FIG. 3
Figure 5:
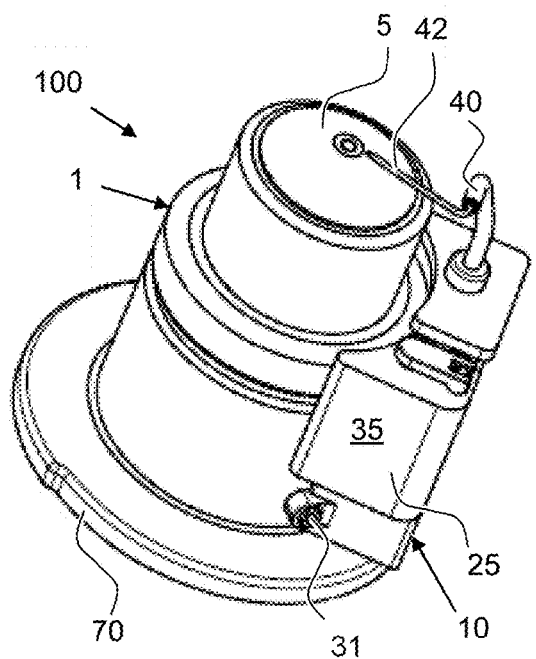
FIG. 5 shows a perspective view corresponding to FIGS. 2-4.

FIGS. 2 to 4 show the mounted state of the immersion set 10 on the immersion objective 1. An immersion fluid tube leads from the immersion fluid tank 20 through a gooseneck tube 40. A gooseneck tube is understood to be a bendable tube that retains its bent shape. The gooseneck tube 40 thus allows the immersion fluid tube to be suitably oriented for the corresponding immersion objective 1. Attached to the end of the immersion fluid tube is a cannula 42, the orientation of which can be adjusted via the gooseneck tube 40. The cannula 42 leads to the objective front side 5. Immersion fluid can thus be brought directly to the desired location without tubes or other components taking up an invasive amount of space and interfering, for example, with microscope components at other objective connections of an objective revolver or with an overview camera.

The immersion set 10 further comprises a control electronics unit 25 connected to the housing part 35. The control electronics unit 25 is connected to the electrical contact unit 50 and is configured to control the supply of immersion fluid.

Figures 7, 8:
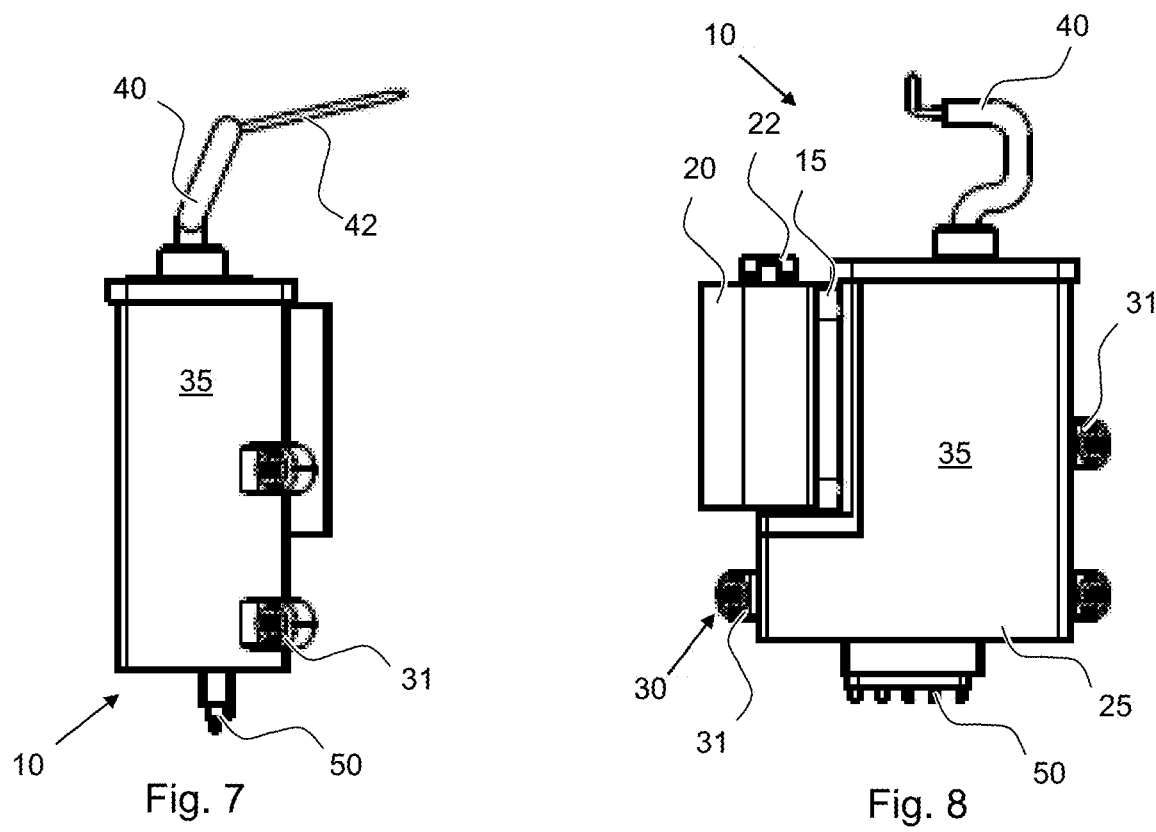
FIG. 7 shows the components of FIG. 6 with a housing in a side view.
FIG. 8 shows a front view corresponding to FIG. 7.

FIG. 6 shows components of the immersion set 10 without a housing, while the same components are shown with a housing in a side view in FIG. 7 and in a front view in FIG. 8. A pump 60, which is controlled by the control electronics unit 25 and fluidly connected to the immersion fluid tank 20 via a tank connection 15, is visible in FIG. 6. The pump 60 can optionally be configured so that it does not come into contact with conveyed immersion fluid. This is the case, e.g., with a tube pump. This can prevent residues of immersion fluid from accumulating on the pump 60. The immersion fluid tank 20 comprises a refill opening 22 arranged in an upper area of the immersion fluid tank 20. A fluid connection with the tank connection 15, on the other hand, occurs in a lower area of the immersion fluid tank 20. This prevents the pump 60 from drawing air when the immersion fluid tank 20 is only partially filled. The orientation shown in FIGS. 6-8, in which the fluid connection of the tank connection 15 occurs in the lower area of the immersion fluid tank 20, is suitable for an inverted microscope operation as shown in FIGS. 2-5. If the same immersion objective 1 be used on an upright microscope, i.e. rotated by 180°, then the fluid connection of the tank connection 15 would be located in an upper area of the immersion fluid tank 20 (without further measures being taken). As a result, the pump 60 would draw air more often. To prevent this, the tank connection 15 in the depicted example embodiment is configured to be pivotable, in particular by 180°. This changes the height of the fluid connection with the immersion fluid tank 20. In the event of a switch between an inverted and an upright operation of the microscope, it is thus possible to simply rotate the tank connection 15. In principle, it can be provided that the same immersion fluid tank 20 is used in both cases. Alternatively, different immersion fluid tanks 20 can be included in the immersion set 10 for upright and inverted operation.

Figure 9:
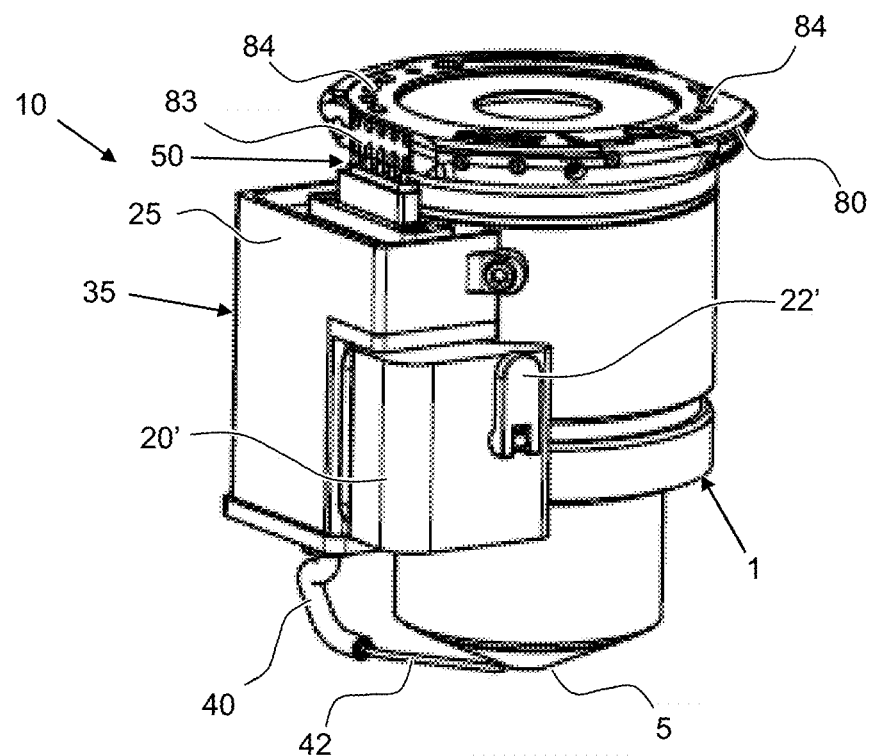
FIG. 9 shows a perspective depiction of an objective with an immersion set according to an example embodiment according to the invention in an upright operation of the microscope.

An operation of an immersion objective 1 with a mounted immersion set 10 on an upright microscope is shown in FIG. 9. The immersion fluid tank 20 has been replaced by a different immersion fluid tank 20' in this case. The immersion fluid tank 20' comprises a refill opening 22' arranged at a different location from the refill opening 22 of the immersion fluid tank 20. The refill opening 22' is thus also accessible during operation so that, if necessary, immersion fluid can be refilled over the course of a long-term experiment without the immersion fluid tank 20 or 20' having to be detached from the tank connection 15.

Figure 10:
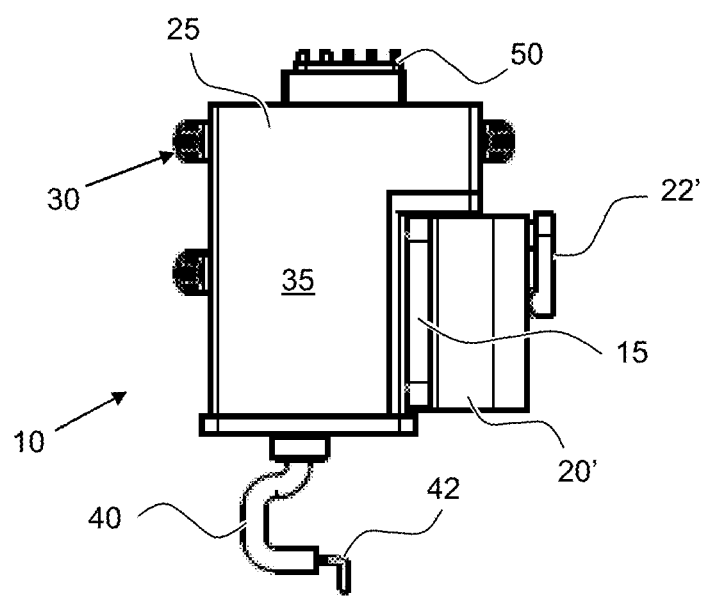
FIG. 10 shows a front view of the immersion set of FIG. 9.

FIG. 10 shows the immersion set 10 of FIG. 9 for the upright operation of the microscope. The tank connection 15 has been pivoted here compared to the situation shown in FIG. 8. In order to prevent the refill opening from being located on the bottom side of the immersion fluid tank, an immersion fluid tank 20' different from the one shown in FIG. 8 is used in FIG. 10. A check valve can be arranged between the pump 60 and the immersion fluid tank 20, 20', in particular at the tank connection 15. The check valve enables a replacement of an immersion fluid tank during which no or few air bubbles are produced.

A check valve can be particularly advantageous in cases where the immersion fluid tank 20 does not comprise a flexible bag (collapsing bag). The flexible bag can be used within a rigid or flexible container or, alternatively, without a surrounding container. By means of the flexible walls of the bag, the volume of the bag decreases in accordance with the shrinking amount of immersion fluid it contains. This makes an emptying of the bag possible regardless of the orientation or position of the tank connection 15. The tank connection 15 thus does not have to pivotable in this case. In further variants, a rigid immersion fluid tank 20 is used without a pivotable tank connection 15.

In still further variants of the embodiments described above, the mounting adapter 80 can be rigidly connected to described components of the immersion set 10, in particular to the electrical contact unit 50, the housing part 35 and/or the pump 60.

In the case of an immersion objective with an electrical interface, the mounting adapter 80 may not be necessary.

Instead, the electrical contact unit 50 can be connected to, for example, contact surfaces of the immersion objective.

Figure 11:
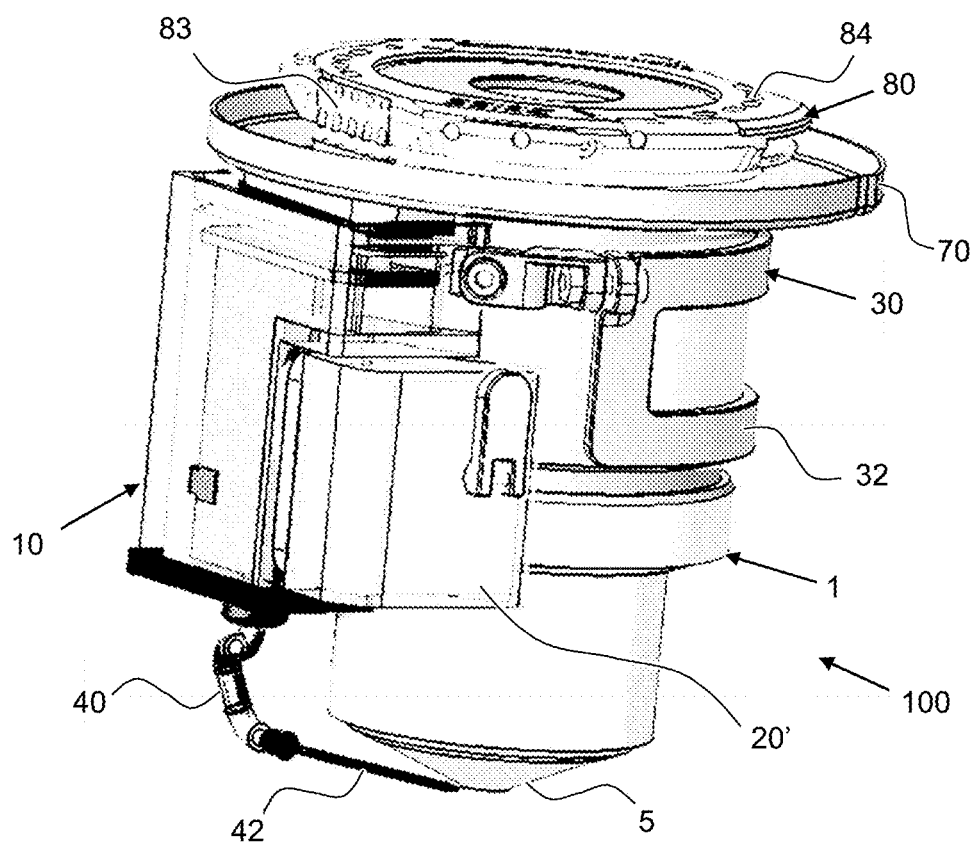
FIG. 11 shows a perspective depiction of an objective with an immersion set according to a further example embodiment according to the invention in an upright operation of the microscope.
Figure 12:
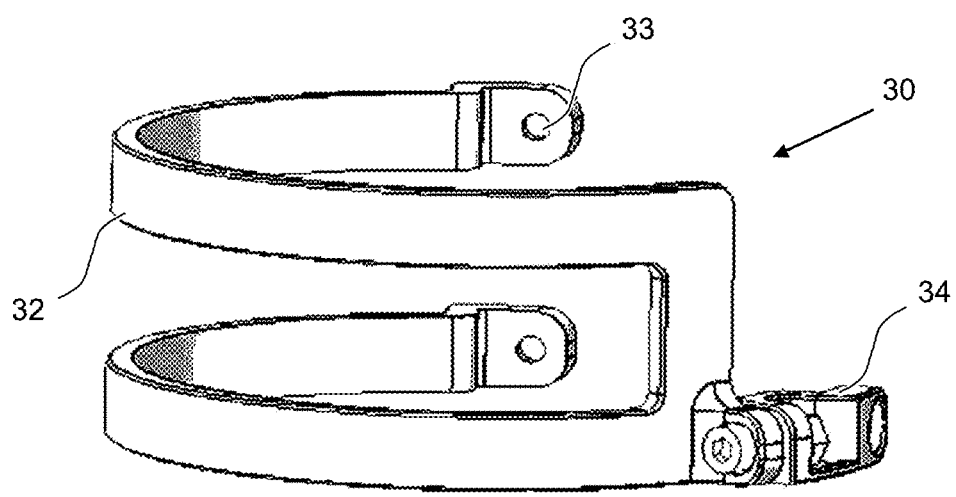
FIG. 12 shows the fastening clip of the immersion set of FIG. 11.

Example Embodiment of FIGS. 11 and 12

FIG. 11 shows a perspective depiction of a further example embodiment of an immersion set 10 according to the invention, mounted on an immersion objective 1. In contrast to the preceding example embodiment, the fastening device 30 here comprises a fastening clip 32. The housing part 35 can either be configured as in the preceding example embodiment or comprise other screw or connection means for connecting to the fastening clip 32. The fastening clip 32 is placed around the circumference of the immersion objective 1 and tightened. This makes it easy to accomplish an azimuthal alignment and to subsequently carry out a secure fastening. The azimuthal alignment is important for the electrical contact unit 50, which must, depending on the application, coincide with the electrical contacts 83 of the mounting adapter 80, the electrical contacts of an objective or the position of an electrical interface of an objective connection of an objective revolver.

FIG. 12 shows an enlargement of the fastening clip 32 used in FIG. 11. The fastening clip 32 has the shape of a ring segment and comprises an adjustable tensioning element 34 which enables a rigid support on the immersion objective 1. At its opposite end, the fastening clip 32 comprises connection elements 33, e.g. screw holes, which can be rigidly connected to the housing part 35, for example via its screw holes 31.

Example Embodiments of FIGS. 13 to 18

Figure 13:
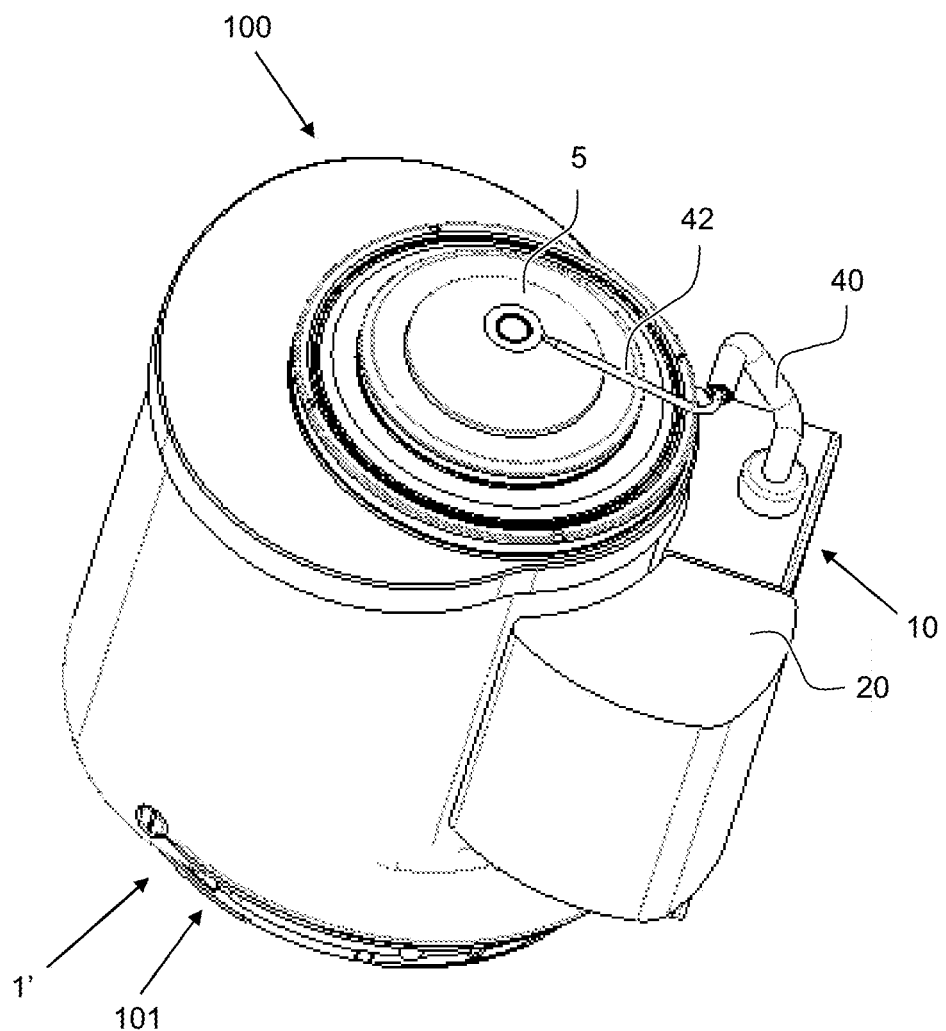
FIG. 13 shows a perspective depiction of a motorized objective with an immersion set according to a further example embodiment according to the invention.

FIG. 13 shows a perspective depiction of a further example embodiment of an immersion set 10 according to the invention mounted on an immersion objective 1'. In this case, the immersion objective 1' is an autocorr objective 101 comprising at least one motor for lens adjustments. The immersion objective 1' is thus does not have circular circumference. The immersion set 10 can nevertheless be fastened on the immersion objective 1', for example via the screw connections described in the foregoing.

Figure 14:
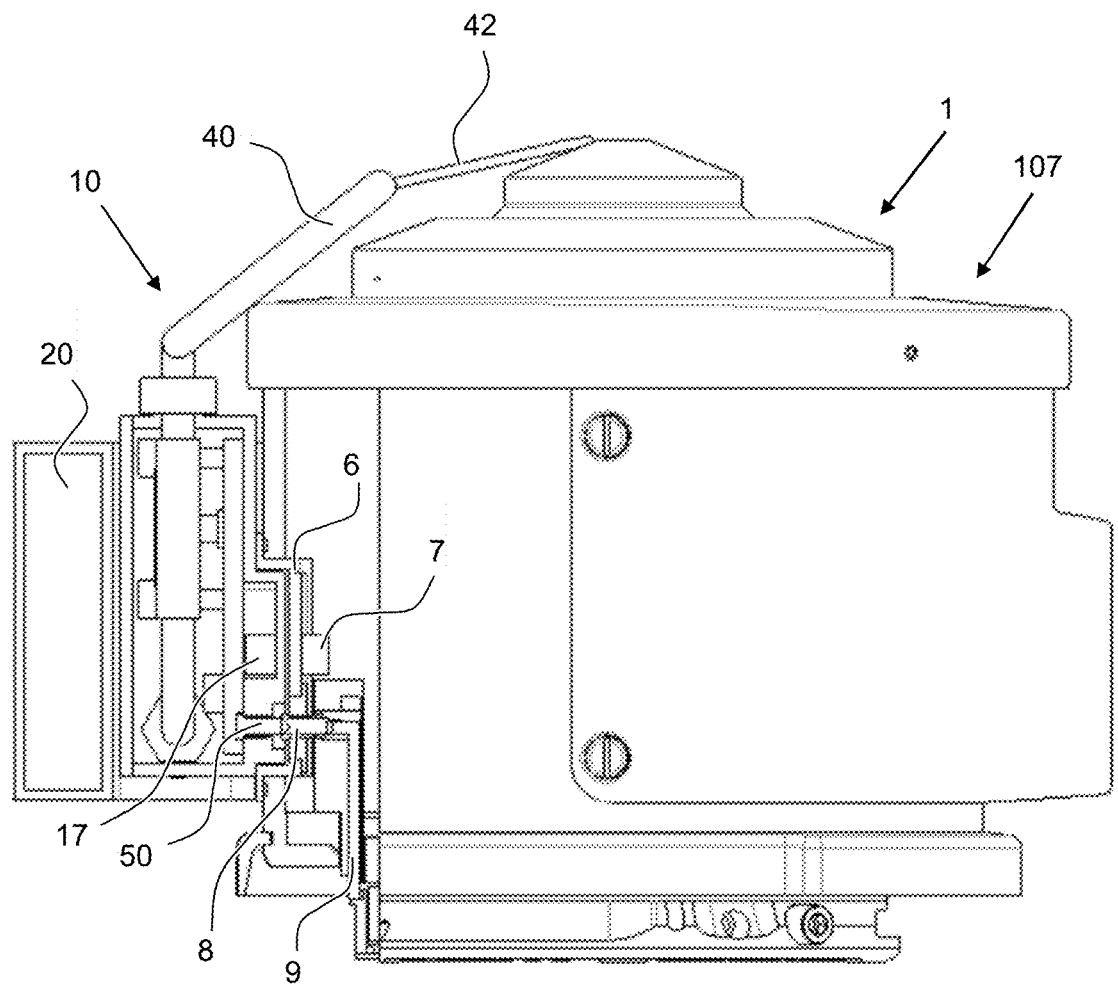
FIG. 14 is a sectional view of an objective with an immersion set according to a further example embodiment according to the invention.
Figure 15:
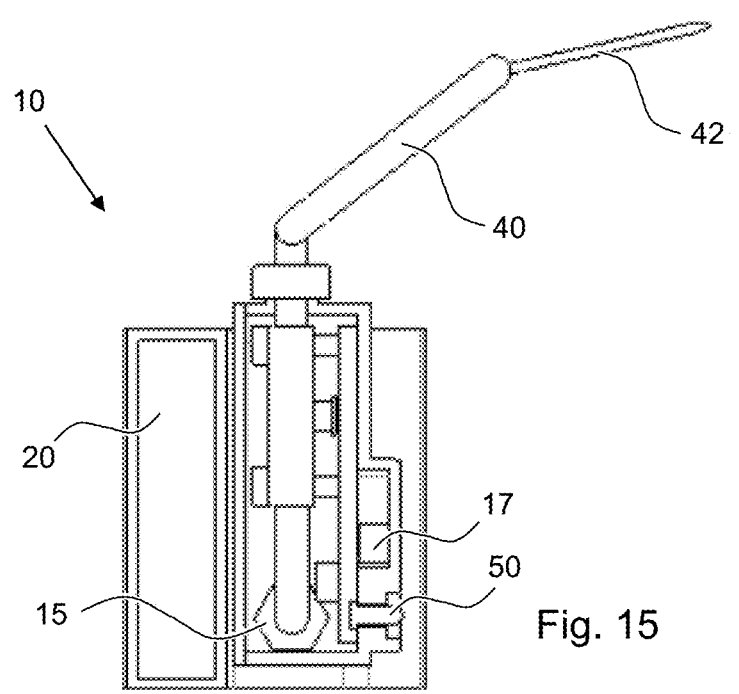
FIG. 15 shows the immersion set of FIG. 14 in a sectional view.
Figure 16:
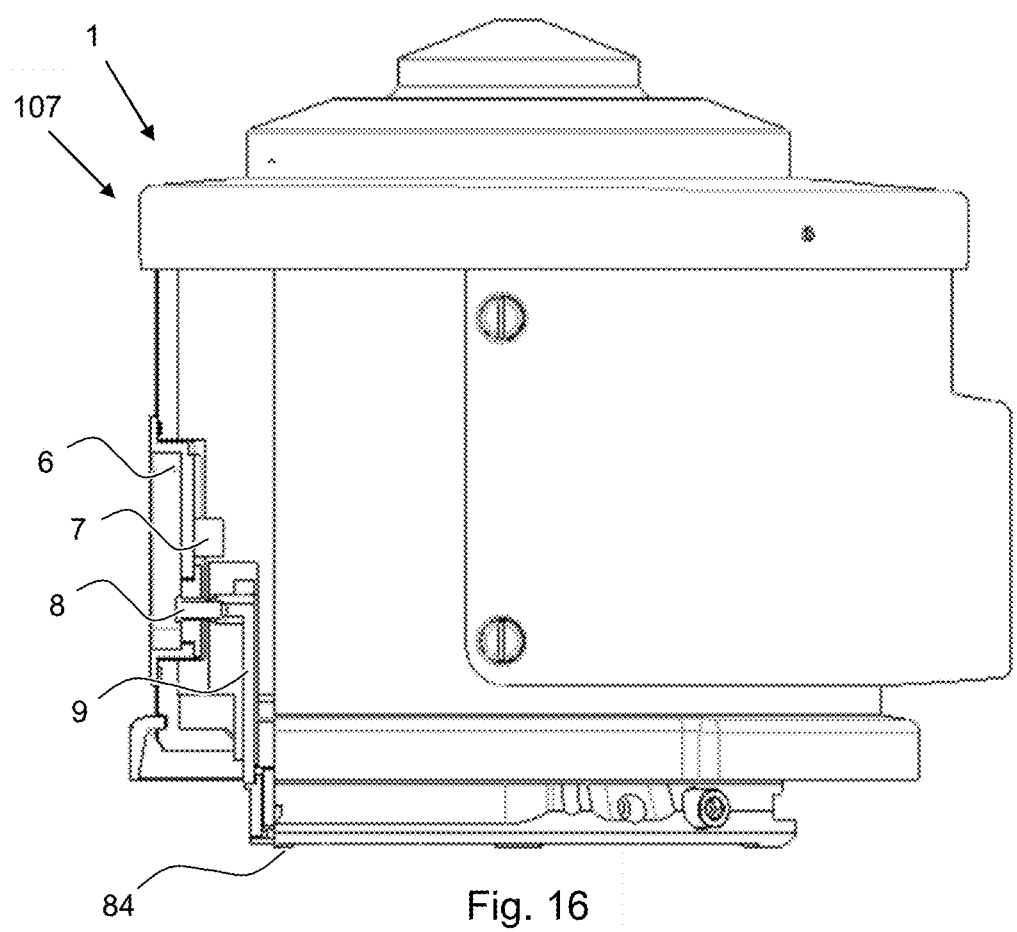
FIG. 16 shows the objective of FIG. 14 in a sectional view.
Figure 17:
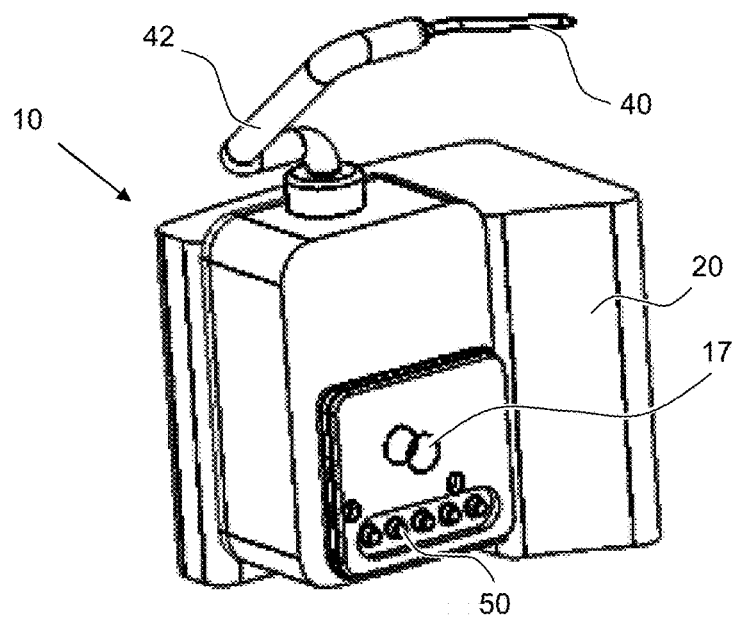
FIG. 17 is a perspective view corresponding to FIG. 15.

FIG. 14 shows a sectional view of an autocorr objective 107 with an immersion set 10 according to an example embodiment of the invention mounted thereon. This immersion set 10 is shown alone in a sectional view in FIG. 15 and in a perspective view in FIG. 17. The autocorr objective 107 is shown alone in a sectional view in FIG. 16 and in a perspective view in FIG. 18.

The objective 107 comprises a recess (receiving recess) 6 on its casing surface at which the immersion set 10 can be docked. The objective 107 comprises, in the area of the receiving recess 6, a magnet 7, which cooperates with a magnet 17 of the immersion set 10 in order to facilitate a correct positioning of the immersion set 10 on the objective 107 and to provide some support. Threaded holes can be formed next to the receiving recess 6 in the objective 107, whereby the attachment of the immersion set via screws is rendered possible.

Figure 18:
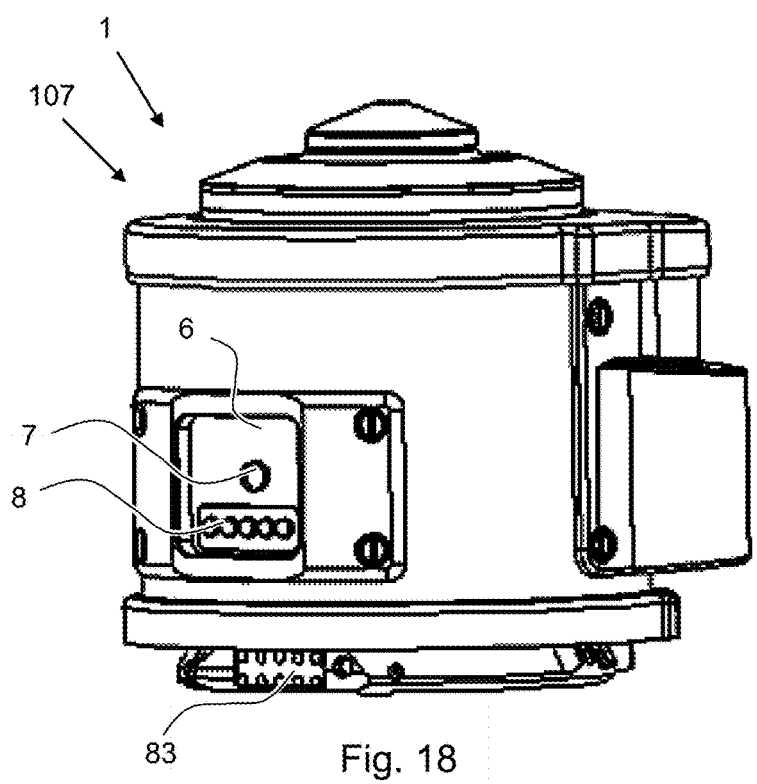
FIG. 18 is a perspective view corresponding to FIG. 16.

The objective 107 further comprises electrical contact surfaces 8 at the receiving recess 6, which are contactable by the electrical contact unit 50 of the immersion set 10. Inside the objective 107, electrical conductors 9 (FIG. 16) lead to an electrical interface 84 of the objective 107, which can be coupled at a bayonet connector to an objective revolver or changer. In this example embodiment, a mounting adapter as described above is used as part of the objective 107. As shown in FIG. 18, electrical contacts 83 are thereby provided, which, however, do not contact the electrical contact unit 50 directly here, but are rather electrically connected inside the objective 107 to the contact surfaces 8 to which the electrical contact unit 50 can be coupled. An advantage of such a design is that a mounting adapter or at least a component thereof can be used both for retrofitting an existing objective and in the production of a new objective.

The structure described here can also be used with objectives other than the depicted autocorr objective 107.

Figure 19:
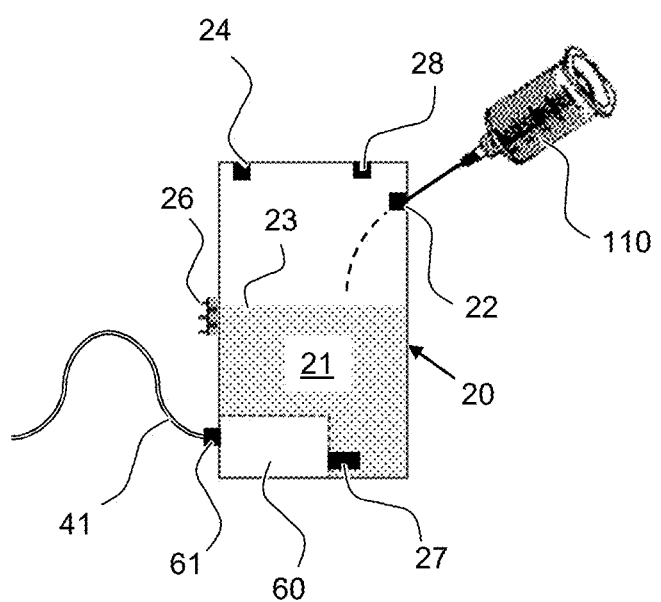
FIG. 19 illustrates the refilling of an immersion fluid tank of an immersion set according to a further example embodiment according to the invention.

Refilling of an Immersion Fluid Tank According to FIG. 19

FIG. 19 shows the refilling of an immersion fluid tank 20 with immersion fluid 21 by means of a syringe 110 with an injection needle. During this process, the immersion fluid tank 20 can be mounted on the immersion objective or detached from the same. When the immersion fluid tank 20 is filled in the mounted state, a fill level 23 can be monitored in real time via a fill-level sensor 24. The depicted immersion fluid tank 20 further has an air vent valve 28. Moreover, the pump 60 is integrated in the immersion fluid tank 20 in this example. The pump 60 sucks immersion fluid 21 in via a pump connection 27 and guides the same to the immersion fluid tube 41, which is attached to a tube connector fitting 61 on the pump 60 or immersion fluid tank 20. Also depicted is an electrical plug/socket connector 26 (a plug connector in the illustrated example) via which the fill-level sensor 24 and optionally also the pump 60 are controlled. The plug/socket connector 26 is arranged at mid-height on the immersion fluid tank 20 and possesses a symmetrical structure. The plug/socket connector 26 can thus be connected in two orientations which are rotated by 180° in relation to one another. The depicted immersion fluid tank 20 can thus be arranged in different orientations for inverted and upright microscopes.

In variants of the embodiment illustrated in FIG. 19, the pump 60 can also be arranged separately from the immersion fluid tank 20. In further variants, the plug/socket connector 26 can be replaced by other electrical connections. Also possible are variants with a disposable tank in which there is no refill opening 22.

Figure 20:
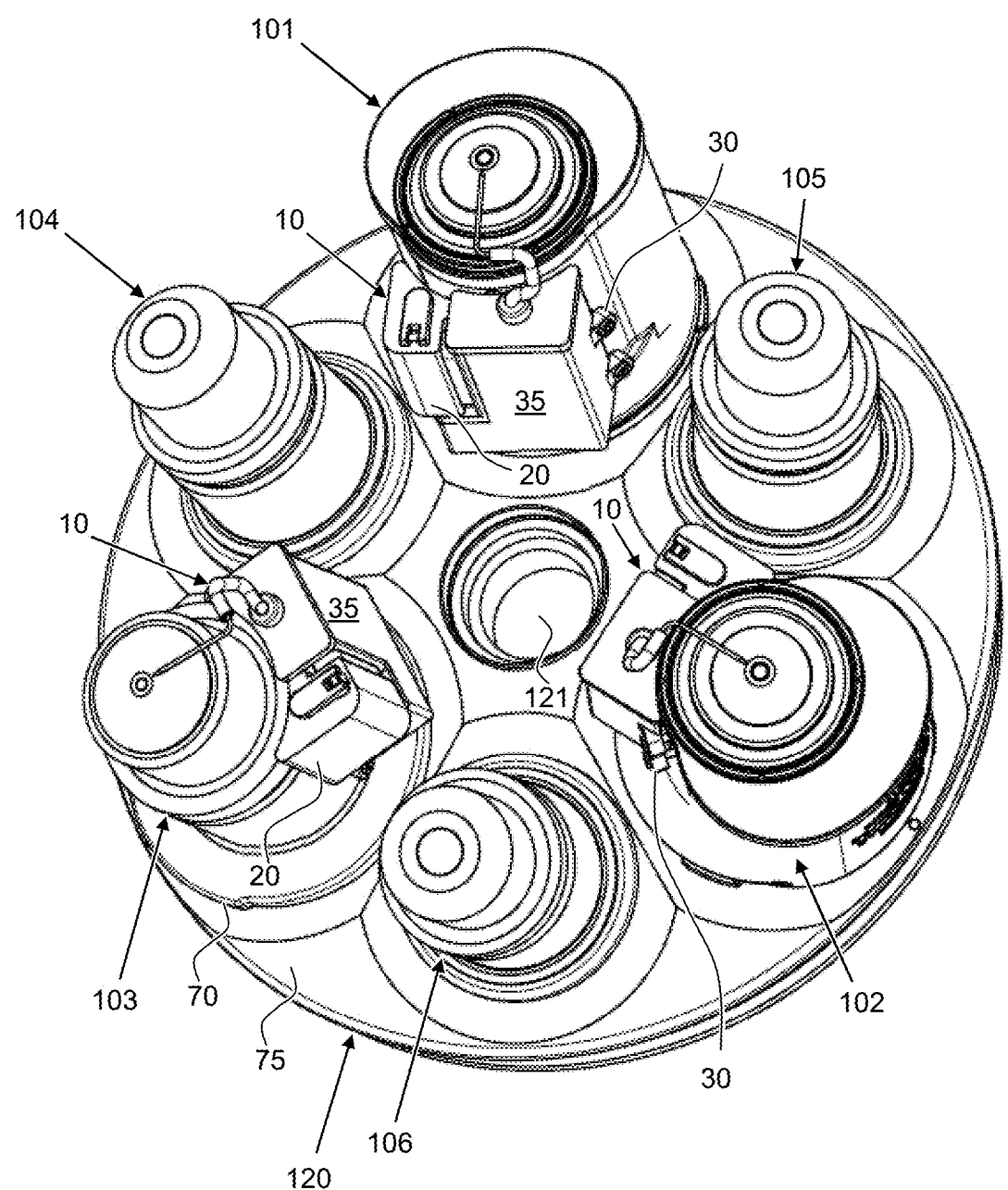
FIG. 20 shows a perspective view of an objective revolver with attached objectives and mounted immersion sets according to a further example embodiment according to the invention.

Example Embodiment of FIG. 20

FIG. 20 shows an objective revolver 120 with six connected objectives 101-106 of an example embodiment of a light microscope in accordance with the invention. Three objectives 101-103 are respectively provided with an immersion set 10 according to the invention. The objective 101 is an autocorr objective, the objective 102 is an autozoom objective while the objective 103 is a standard immersion objective. The electrical supply of the autocorr function of the objective 101 or of the autozoom function of the objective 102 occurs via the same electrical interfaces of the objective-revolver connection used by the respective immersion sets 10.

The three other objectives 104-106 are depicted in order to illustrate that, as a result of the compact dimensions of the immersion sets 10, all connections of the objective revolver 120 remain usable.

For mounting, the immersion set 10 can first be completely connected to an immersion objective 1. In particular the fastening device 30, the objective protection ring 70 and the optional mounting adapter 80 are attached to the immersion objective 1. These components together are designated as the combination 100. A revolver cover 75 is fixed on the objective revolver 120, the revolver cover 75 comprising openings corresponding to the connections of the objective revolver 120. The combination 100 is then mounted on one of the objective-revolver connections. The objective protection ring 70 now effects a liquid drainage to the revolver cover 75 from where liquid is further guided to a drainage channel not depicted here.

It may be preferred to mount the immersion sets 10 on the corresponding objectives 101-103 substantially in a direction towards the rotation axis 121 of the objective revolver 120. Each immersion fluid tank 20 in the mounted state is thus located in particular between the corresponding objective 101-103 and the rotation axis 121. The available space is thus used efficiently without a risk of collisions or interference with other microscope components.

Figure 21:
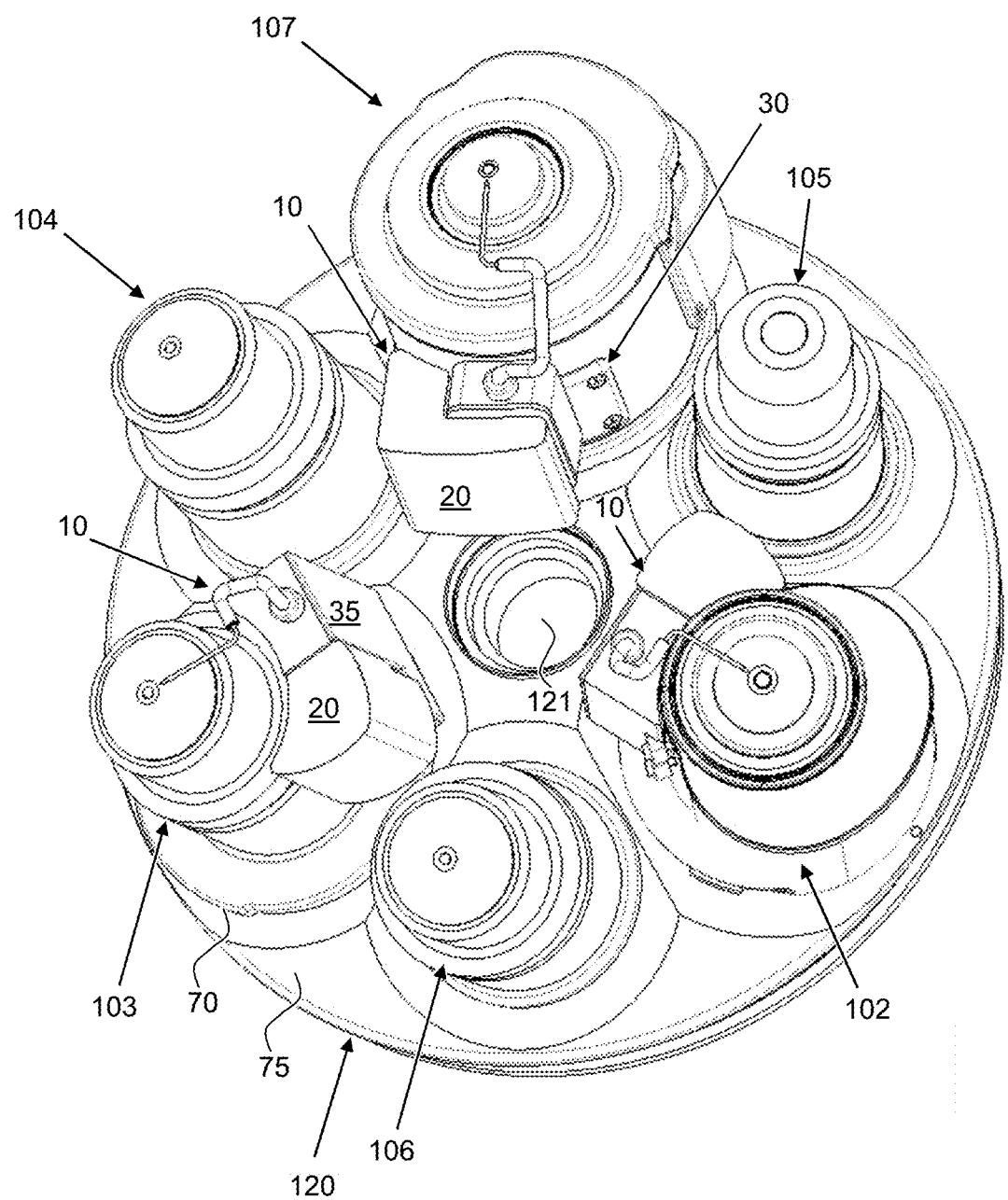
FIG. 21 shows a perspective view of an objective revolver with attached objectives and mounted immersion sets according to a still further example embodiment according to the invention.

Example Embodiment of FIG. 21

FIG. 21 shows an objective revolver 120 with connected objectives 102-107 of an example embodiment of a light microscope in accordance with the invention. This example embodiment differs from the preceding figure in particular by the design of the immersion fluid tanks 20. In this example, each immersion fluid tank 20 is constituted by a, in particular form-stable, container, in which a collapsing bag filled with immersion fluid is accommodated. In principle, the collapsing bag can also be provided without a surrounding container.

In a variant of the depicted embodiment, an additional collapsing bag with immersion fluid is connected to one of the immersion fluid tanks 20. The additional collapsing bag can optionally be accommodated in a form-stable tank or in a flexible bag. The immersion fluid tank has a corresponding fluid connection to which the collapsing bag can be attached as a reserve supply of immersion fluid.

In a further variant of the embodiment of FIG. 21, a collapsing bag with immersion fluid is connected to the housing part 35, wherein a fluid connection on the housing part 35 establishes a connection to the pump or one of the pumps. The collapsing bag here is not connected to an immersion fluid tank and can accordingly contain a different immersion fluid from the immersion fluid tank 20.

In both of the aforementioned variants, the collapsing bag can be located between the rotation axis 121 or central axis of the objective revolver and the corresponding housing part 35 or immersion fluid tank 20. The collapsing bag thus uses the available space in a direction towards the rotation axis 121.

FIG. 21 also shows a fastening device 30 of the immersion set 10 on the objective 107. The fastening device 30 here comprises screws, which are screwed into corresponding threaded holes on the objective 107. The objective 103, on the other hand, has a circular circumference without threaded holes so that the fastening clip 32 of FIG. 12 is suitable for the fastening of the immersion set 10 in this case.

Figure 22:
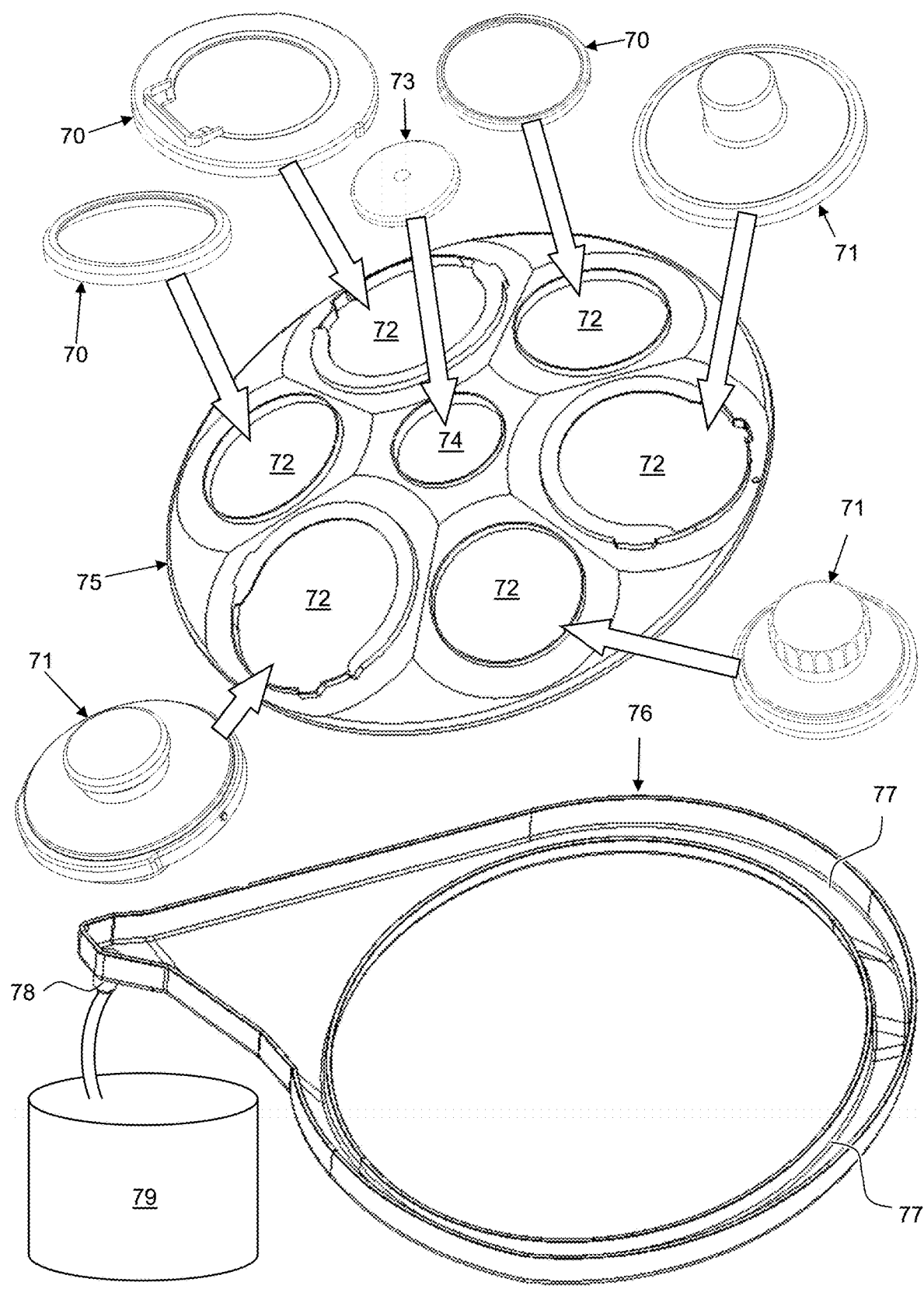
FIG. 22 shows schematically components of a damage-protection system of an immersion set.

Damage-Protection System According to FIG. 22

FIG. 22 shows components of a damage-protection system for protecting microscope components from contact with a liquid. The damage-protection system can be considered a part of the immersion sets described in the foregoing or of the microscope and comprises a plurality of the described objective protection rings 70 in addition to a revolver cover 75 and a stand protector 76. The revolver cover 75 comprises a plurality of objective openings 72 and, in an operational state, is positioned on an objective revolver. The locations of the objective openings 72 correspond to the objective positions of the objective revolver so that each objective can extend through a corresponding objective opening 72. The objective protection rings 70 prevent an ingress of fluid between objectives and the revolver cover 75.

Interface covers 71 are provided for objective openings 72 which are not currently occupied by an objective. An interface cover 71 can be mounted in an objective opening 72 and prevents fluid from entering the same. The objective openings 72 can have different shapes in order to accommodate objectives of different shapes. The interface covers 71 can thus also differ in shape. Likewise, the objective protection rings 70 can also have different sizes and/or shapes.

The revolver cover 75 can optionally comprise an opening (rotation-axis opening 74) lying on an axis of rotation of the objective revolver. For example, a fastening of the revolver cover 75 can occur via the rotation-axis opening 74. The revolver cover 75 can be readily detached and removed in this manner, for example for cleaning purposes. The rotation-axis opening 74 can also be provided with a cover (rotation-axis cover 73) in order to prevent an entry of liquid into the rotation-axis opening 74. In alternative designs, the rotation-axis opening 74 is omitted. In these cases, the revolver cover 75 can be fixed, for example, by means of magnets or clips.

The stand protector 50 comprises an opening so that the stand protector 50 can be configured around a stand or the objective revolver. A drainage channel 77, in which liquid that reaches the stand protector 76 is collected and drained, extends around the opening in a circumferential direction. The drainage channel 77 is annular in this example. Alternatively, the drainage channel 77 does not have to form a closed shaped and the opening does not have to be enclosed in a radial direction. The drainage channel 77 leads to a drain 78 in the stand protector 76. A collection container 79 is connected to the drain 78, for example via a drain tube.

In the illustrated example embodiments, components of the immersion set 10 are mounted directly on the immersion objective 1. Alternatively, the fastening device 30 can be configured in such a manner that the components are supported via the mounting adapter 80. The circumferential shell of the immersion objective 1 then optionally serves solely to support a correct alignment, while the load-bearing fastening of the immersion set 10 is realized via the mounting adapter 80.

The described example embodiments advantageously render possible a compact arrangement of the essential immersion components directly on the immersion objective. The handling and possible uses of the immersion objective are thus improved significantly. Moreover, an automated and precise control of the supply of immersion fluid can occur. The described example embodiments can be varied within the framework of the attached claims, it being in particular possible to combine elements of different example embodiments.

LIST OF REFERENCES 1, 1' Immersion objective
3 Thread of the immersion objective
5 Objective front side
6 Receiving recess on the immersion objective
7 Magnet on the immersion objective
8 Electrical contact surfaces of the immersion objective
9 Electrical conductors of the immersion objective 10 Immersion set
15 Tank connection
17 Magnet of the immersion set
20, 20' Immersion fluid tank
21 Immersion fluid
22, 22' Refill opening
23 Fill level
24 Fill-level sensor
25 Control electronics unit
26 Electrical plug/socket connector
27 Pump connection
28 Air vent valve
30 Fastening device
31 Screw holes
32 Fastening clip
33 Connection elements/screw holes of the fastening clip
34 Tensioning element of the fastening clip
35 Housing part
40 Gooseneck tube
41 Immersion fluid tube
42 Cannula
50 Electrical contact unit
60 Pump
61 Tube connector fitting
70 Objective protection ring
71 Interface cover for revolver positions not in use
72 Objective opening of the revolver cover
73 Rotation-axis cover
74 Rotation-axis opening of the revolver cover
75 Revolver cover
76 Stand protector
77 Drainage channel of the stand protector
78 Drain
79 Collection container
80 Mounting adapter
81 Mounting connection for an immersion objective
82 Mounting interface with an electrical interface 84
83 Electrical contacts
84 Electrical interface
100 Combination of immersion objective 1 and immersion set 10
101-107 Objectives
110 Syringe
120 Objective revolver
121 Rotation axis of the objective revolver 120

We claim:

1. An immersion set for retrofitting an immersion objective, comprising:
   at least one immersion fluid tank;
   at least one pump fluidly connected to the immersion fluid tank;
   a control electronics unit configured at least to control the pump; and
   a fastening device configured to realize a load-bearing fastening of the at least one immersion fluid tank, the at least one pump and the control electronics unit on the immersion objective such that a weight of the at least one immersion fluid tank, the at least one pump and the control electronics unit is carried by the immersion objective.

2. The immersion set of claim 1, further comprising:
   an electrical contact unit connected to the control electronics unit and to the at least one pump and configured to establish an electrical connection.

3. The immersion set of claim 1, further comprising
   a mounting adapter for an immersion objective, the mounting adapter comprising a mounting connection for connecting the immersion objective, and a mounting interface for connecting to an objective revolver.

4. The immersion set of claim 3,
   wherein the mounting interface of the mounting adapter comprises an electrical interface for connecting to electrical contacts of the objective revolver, and
   wherein the mounting adapter comprises electrical contacts, which are electrically connected to the electrical interface and to which the electrical contact unit can be electrically coupled.

5. The immersion set of claim 1,
   wherein each immersion fluid tank comprises a form-stable or flexible shell and a collapsing bag with immersion fluid accommodated therein so as to enable an emptying of the immersion fluid tank during both an inverted as well as an upright microscope configuration.

6. The immersion set of claim 5,
   further comprising an additional collapsing bag, which is connected to the collapsing bag of the immersion fluid tank as a reserve volume.

7. The immersion set of claim 6,
   wherein at least one of the collapsing bag and the additional collapsing bag is oriented relative to the electrical contact unit in such a manner that, in a mounted state on an immersion objective and objective revolver, the collapsing bag or the additional collapsing bag is oriented towards a rotation axis of the objective revolver.

8. The immersion set of claim 1,
   wherein the fastening device comprises a fastening clip configured to be tightened around the immersion objective.

9. The immersion set of claim 1,
   wherein the fastening device comprises a housing part via which the pump, the control electronics unit and the immersion fluid tank are supported, wherein the housing part comprises screw holes for screwing the housing part to an outer shell of the immersion objective.

10. The immersion set of claim 1,
    further comprising at least one tank connection, which is fluidly connected to the at least one pump and which is configured such that the at least one immersion fluid tank can be connected in a detachable manner,
    wherein the at least one tank connection is pivotable for use with an inverted and an upright microscope configuration.

11. The immersion set of claim 10,
    comprising two immersion fluid tanks, each comprising a refill opening,
    wherein the immersion fluid tanks differ in the arrangement of their refill openings,
    wherein an appropriate immersion fluid tank of the two immersion fluid tanks can be selectively connected to the tank connection for use with an inverted or an upright microscope configuration.

12. The immersion set of claim 1, further comprising
    an immersion fluid tube, which is fluidly connected to the pump, and
    a flexible gooseneck tube, which is supported via the fastening device,
    wherein the immersion fluid tube is guided through the gooseneck tube.

13. The immersion set of claim 12,
    wherein a rigid cannula is arranged at one end of the immersion fluid tube, said rigid cannula extending away from the gooseneck tube in order to prevent a contact of the gooseneck tube with immersion fluid.

14. The immersion set of claim 1,
further comprising an objective protection ring for realization of a liquid-tight sealing,
wherein the objective protection ring comprises an elastic sealing ring for enclosing the immersion objective,
wherein the objective protection ring comprises a recess for a liquid-tight passage of an electrical contact unit, and
wherein the objective protection ring comprises electrically conductive parts for electromagnetic shielding.

15. A combination of an immersion objective and an immersion set of claim 1,
wherein the immersion set is fastened on the immersion objective.

16. A light microscope with a stand, with an objective revolver comprising at least one objective-revolver connection with an electrical interface, and with the combination of claim 15.

17. The light microscope of claim 16,
wherein a mounting adapter is mounted on the objective-revolver connection with an electrical interface and leaves the electrical interface free, and
wherein the electrical contact unit contacts the electrical interface of the objective-revolver connection.

18. A method for retrofitting an immersion objective with an immersion set, comprising
load-bearing fastening, by means of a fastening device, of at least one immersion fluid tank, at least one pump and a control electronics unit for the pump on the immersion objective such that a weight of the at least one immersion fluid tank, the at least one pump and the control electronics unit is carried by the immersion objective.

19. An immersion set for retrofitting an immersion objective, comprising:
at least one immersion fluid tank;
at least one pump fluidly connected to the immersion fluid tank;
a control electronics unit configured at least to control the pump;
a mounting adapter for the immersion objective, wherein the mounting adapter has a mounting connection for connecting the immersion objective and a mounting interface for connecting to an objective revolver; and
a fastening device configured to realize a load-bearing fastening of the at least one immersion fluid tank, the at least one pump and the control electronics unit on the mounting adapter for the immersion objective such that a weight of the at least one immersion fluid tank, the at least one pump and the control electronics unit is carried by the mounting adapter.

20. An immersion set for retrofitting an immersion objective, comprising:
at least one immersion fluid tank;
at least one pump fluidly connected to the immersion fluid tank;
a control electronics unit configured at least to control the pump; and
a fastening device configured to realize a load-bearing fastening of the at least one immersion fluid tank, the at least one pump and the control electronics unit on the immersion objective;
wherein the fastening device comprises a housing part via which the pump, the control electronics unit and the immersion fluid tank are supported by the immersion objective.

* * * * *